United States Patent
Junge et al.

(10) Patent No.: US 8,984,902 B2
(45) Date of Patent: Mar. 24, 2015

(54) SYSTEM TO CONTROL EXTERNAL CONDENSATION ON A REFRIGERATOR

(75) Inventors: Brent Alden Junge, Evansville, IN (US); Eric Paez, Louisville, KY (US); Joseph Thomas Waugh, Louisville, KY (US); Kristin Marie Weirich, Louisville, KY (US)

(73) Assignee: General Electric Company, Schenectady, NY (US)

( * ) Notice: Subject to any disclaimer, the term of this patent is extended or adjusted under 35 U.S.C. 154(b) by 902 days.

(21) Appl. No.: 12/839,582

(22) Filed: Jul. 20, 2010

(65) Prior Publication Data

US 2012/0017612 A1 Jan. 26, 2012

(51) Int. Cl.
F25B 39/04 (2006.01)
F25D 17/00 (2006.01)
F25D 21/04 (2006.01)

(52) U.S. Cl.
CPC ......... *F25D 21/04* (2013.01); *F25B 2600/0251* (2013.01); *F25B 2600/111* (2013.01); *F25B 2700/02* (2013.01); *Y02B 30/743* (2013.01); *Y02B 40/32* (2013.01)
USPC ................... 62/183; 62/181; 62/150; 62/158; 62/89

(58) Field of Classification Search
CPC ................. F25B 2313/0293; F25B 2313/0294
USPC .......... 62/150, 158, 181, 183, 98, 89
See application file for complete search history.

(56) References Cited

U.S. PATENT DOCUMENTS

| | | | | | |
|---|---|---|---|---|---|
| 3,385,350 | A | * | 5/1968 | McGrath | 165/287 |
| 5,778,689 | A | * | 7/1998 | Beatenbough | 62/150 |
| 6,594,554 | B1 | * | 7/2003 | Seem et al. | 700/276 |
| 7,137,262 | B2 | * | 11/2006 | Carter | 62/150 |
| 7,207,181 | B2 | * | 4/2007 | Murray et al. | 62/150 |
| 7,340,907 | B2 | * | 3/2008 | Vogh, III | 62/150 |
| 7,421,847 | B2 | * | 9/2008 | Murray et al. | 62/80 |
| 7,886,549 | B2 | * | 2/2011 | Kawakatsu et al. | 62/183 |
| 2005/0229614 | A1 | * | 10/2005 | Ansted | 62/150 |
| 2007/0039339 | A1 | * | 2/2007 | Lee | 62/183 |
| 2009/0090114 | A1 | | 4/2009 | Choo | |

FOREIGN PATENT DOCUMENTS jp    2006-138632    *    6/2006

* cited by examiner

*Primary Examiner* — Frantz Jules
*Assistant Examiner* — Steve Tanenbaum
(74) *Attorney, Agent, or Firm* — GE Global Patent Operation; Douglas D. Zhang

(57) ABSTRACT

A cooling system for an appliance includes an evaporator stage, a compressor stage coupled to the evaporator stage and a condenser stage coupled to the compressor stage. The condenser stage includes a condenser and a condenser cooling fan for cooling the condenser, and a condenser loop coupled between the condenser stage and the evaporator stage. A humidity sensor is configured to detect a humidity level in an area of the cooling system and a controller is configured to cycle an operating state of the condenser cooling fan from ON to a low speed or OFF prior to an end of a cooling cycle.

20 Claims, 5 Drawing Sheets

SYSTEM TO CONTROL EXTERNAL CONDENSATION ON A REFRIGERATOR

BACKGROUND OF THE INVENTION

The present disclosure generally relates to appliances, and more particularly to an external surface heating system for a refrigerator.

The formation of condensation on the external surfaces of a refrigerator is typically addressed by attempting to keep the temperature of all exposed refrigerator surfaces above the dew point. Generally this is done by insulation or adding heat. Refrigerators will generally have external surfaces that are warmed by a refrigerant from the high-pressure side of the refrigeration system. The device used to warm these external surfaces is typically called a condenser loop. Adding heat with a condenser loop is energy efficient. The typical surfaces of a refrigerator that are warmed by a condenser loop generally include for example, the freezer cabinet flanges, cabinet doors, the divider between the fresh food and freezer compartments, and the external cabinet in the vicinity of the cold plate on a bottom mount ice and water maker.

These external surfaces receive heat when the cooling system is operating. A typical cooling system will generally cycle between an ON and OFF state. In the ON state, the cooling system is running and the condenser loop will heat the nearby surfaces, or the surfaces to which it is coupled. When the cooling system is OFF, the temperature will drop across these surfaces. If the temperature across the surfaces drops below the dew point, condensation can form. In some cases, the condenser loop by itself is not always able to provide sufficient heat to certain surfaces, such as the divider between the fresh food and freezer compartments in a bottom mount freezer model. An electric heater can be added in addition to the condenser loop to provide sufficient heat for such surfaces. However, the addition of an electric heater increases both the cost and energy usage of the refrigerator.

Accordingly, it would be desirable to provide a system that addresses at least some of the problems identified.

BRIEF DESCRIPTION OF THE INVENTION

As described herein, the exemplary embodiments overcome one or more of the above or other disadvantages known in the art.

One aspect of the exemplary embodiments relates to cooling system for an appliance. In one embodiment, the cooling system includes an evaporator stage, a compressor stage coupled to the evaporator stage and a condenser stage coupled to the compressor stage. The condenser stage includes a condenser and a condenser cooling fan for cooling the condenser, and a condenser loop coupled between the condenser stage and the evaporator stage. A humidity sensor is configured to detect a humidity level in an area of the cooling system and a controller is configured to cycle an operating state of the condenser cooling fan from ON to a low speed or OFF prior to an end of a cooling cycle.

In another aspect, the disclosed embodiments are directed to a refrigerator. In one embodiment, the refrigerator includes a cabinet defining a plurality of storage compartments and a cooling system configured to cool the storage compartments during a cooling cycle. The cooling system includes a condenser and a condenser cooling fan. A controller is configured to control the condenser cooling fan by cycling the condenser cooling fan to a low speed or an OFF state at a pre-determined time prior to an end of the cooling cycle.

In a further aspect, the disclosed embodiments are directed to a method. In one embodiment, the method includes determining an ambient humidity level in an area of an appliance, controlling an operating cycle of a condenser cooling fan in a cooling system for the appliance during a cooling cycle by causing the condenser cooling fan to cycle to a low speed or OFF at a pre-determined time period prior to the end of the cooling cycle when the ambient humidity level exceeds a pre-determined value.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
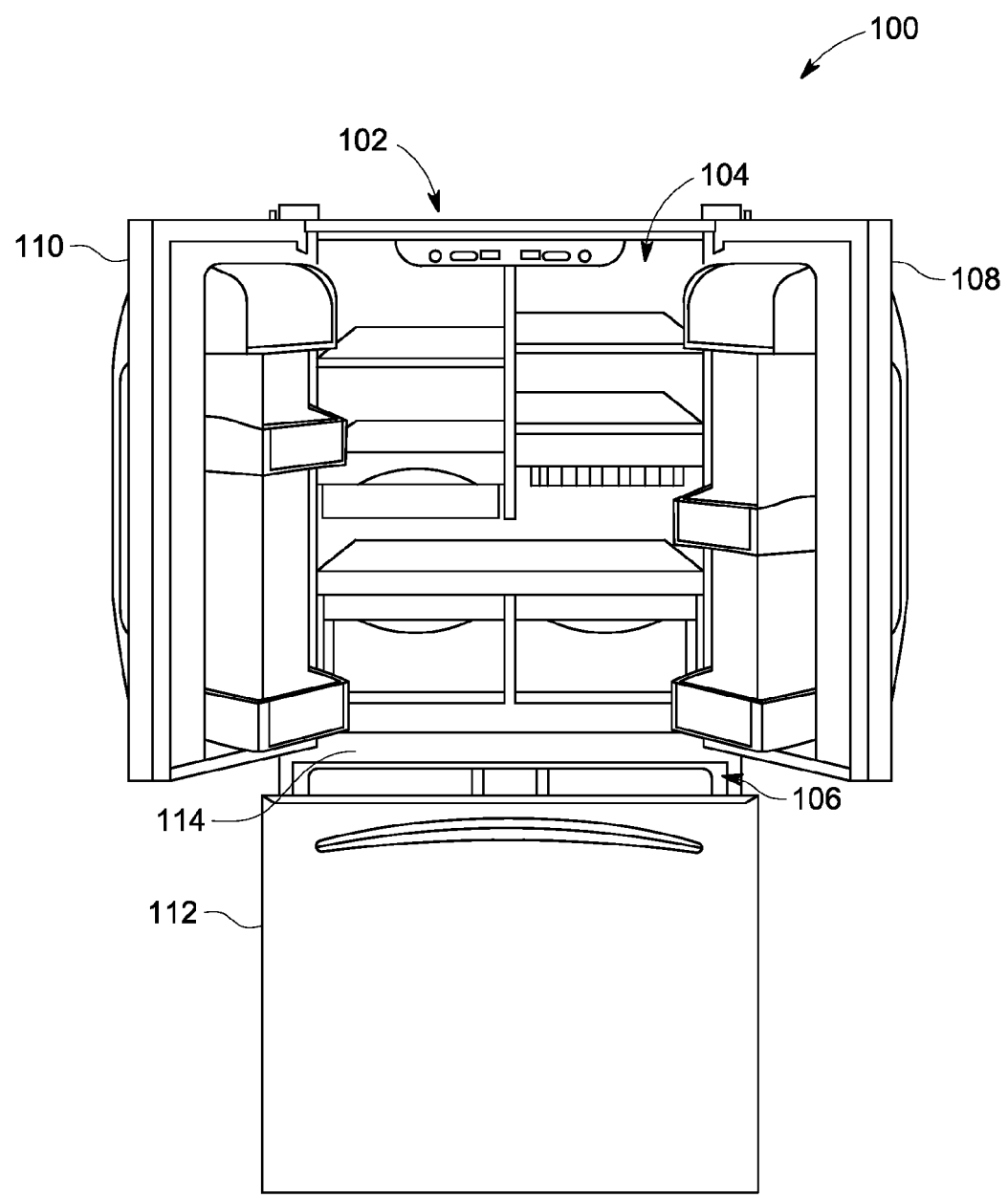
FIG. 1 is a perspective view of an exemplary appliance incorporating aspects of the disclosed embodiments.

Referring to FIG. 1, an exemplary appliance, such as a refrigerator, incorporating aspects of the disclosed embodiments, is generally designated by reference numeral 100. The aspects of the disclosed embodiments are generally directed to preventing the formation of condensation on the external surfaces of a refrigerator. In alternate embodiments, the aspects of the present disclosure can be applied to any refrigeration or cooling system in which condensation can form on external surfaces of the appliance, such as for example, an air-conditioning system.

The refrigerator 100 shown in FIG. 1 is a multi-compartment refrigerator 100 that includes at least two compartments within a cabinet structure 102, including, for example, a fresh food compartment 104 and a freezer compartment 106. In alternate embodiments, the refrigerator 100 of the present disclosure can include any suitable number of compartments. The refrigerator 100 includes doors 108 and 110 for the fresh food compartment 104, and a door or drawer 112 for the freezer compartment 106. A divider or mullion 114 separates the fresh food compartment 104 from the freezer compartment 106.

Figure 2:
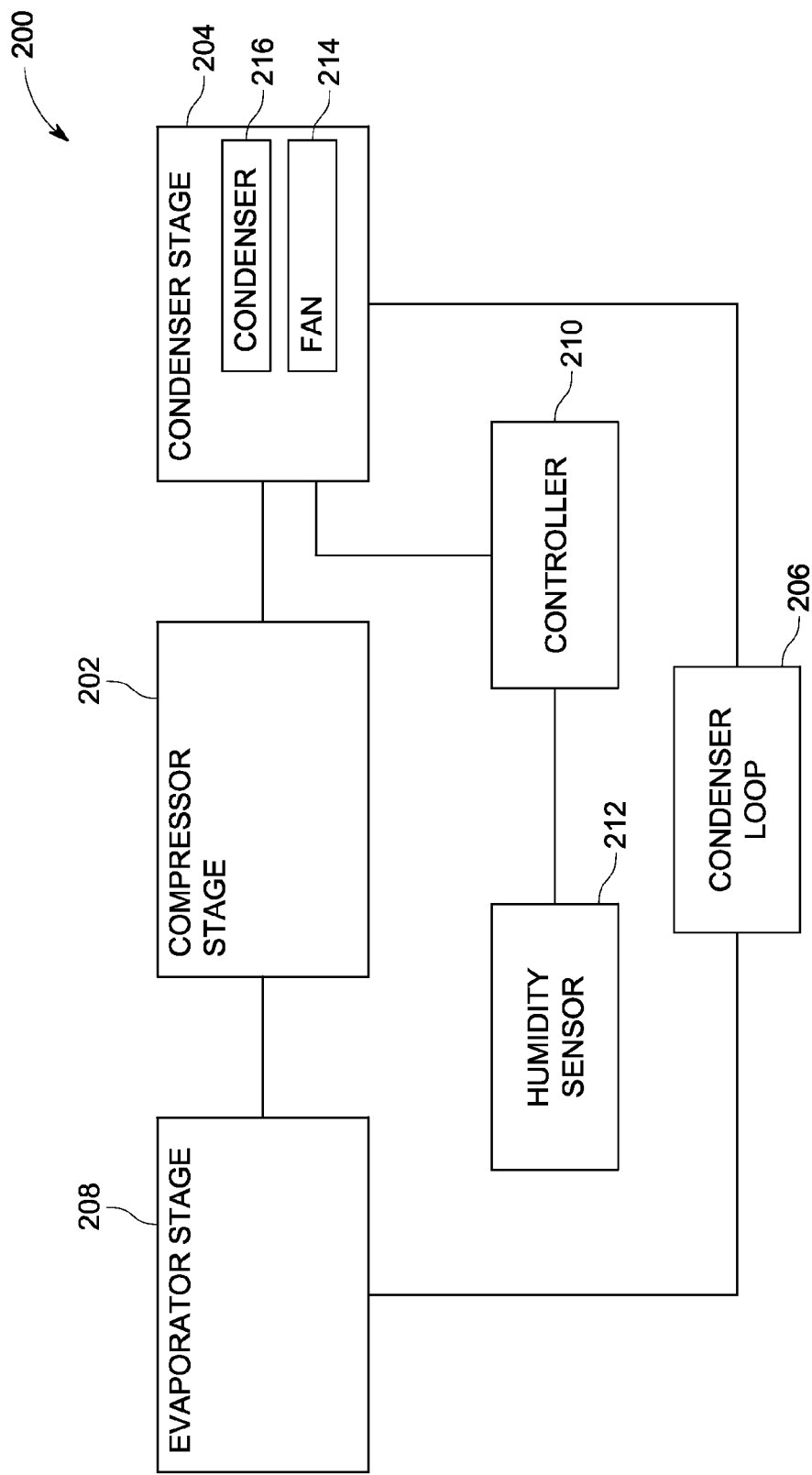
FIG. 2 is a block diagram of one embodiment of a cooling system incorporating aspects of the present disclosure.

FIG. 2 illustrates one embodiment of a cooling system 200 for the refrigerator 100 incorporating aspects of the disclosed embodiments. In one embodiment, the cooling system 200 includes a compressor stage 202, a condenser stage 204, a condenser loop or coil 206 and an evaporator stage 208. In one embodiment the condenser stage 204 includes a condenser 216 and a condenser cooling fan 214. A controller 210 is configured to control the operation of the system 200, including the condenser cooling fan 214 in the condenser stage 204. In one embodiment, the system 200 can also include a humidity sensor 212 that is coupled to the controller 210 and is configured to detect a humidity level.

The compressor stage 202 is generally configured to compress a low-pressure refrigerant received from the evaporator stage 208 into a high-temperature and high-pressure gaseous refrigerant. The condenser stage 204 is connected to the compressor stage 202 and is configured to condense the compressed gaseous refrigerant into a liquid refrigerant. The evaporator stage 208 is connected between the condenser stage 204 and the compressor stage 202 and is generally configured to evaporate the expanded refrigerant and generate cool air. Each of the compressor stage 202, the condenser stage 204 and evaporator stage 208 can include other suitable components for providing the general functionalities described herein.

The condenser loop or coil 206 is connected between the condenser stage 204 and the evaporator stage 208 and receives the expanded liquid refrigerant from the condenser stage 204. In one embodiment, the condenser loop 206 can be part of the condenser stage 204. The condenser loop 206 is generally configured within the refrigerator 100 to be in contact with, or in the vicinity of surfaces or components in order to apply or transfer the heat generated from the expanded and compressed refrigerant to the respective surfaces or components, typically by a heat convection process.

The condenser cooling fan 214 is generally configured to cool the condenser unit 216 in the condenser stage 204 when the cooling system 200 is operating. The condenser cooling fan 214 can comprise an AC or DC powered fan. In one embodiment, the condenser cooling fan 214 comprises a variable speed fan that can be adjusted across a range of speeds varying from a high speed to a low speed or off. Generally, the condenser cooling fan 214 will have a high or full speed of approximately 1200 RPM. The high or full speed state will generally be referred to herein as the ON state or mode of the condenser cooling fan 214. In alternate embodiments, the high or full speed state can be any suitable speed, other than 1200 RPM.

In one embodiment, the condenser cooling fan 214 will be configured to be adjusted or set to a speed that is lower than the high or full speed state when the cooling system 200 is ON or in an operational mode. For example, in one embodiment, a low speed state or setting of the condenser cooling fan 214 is less than approximately 1200 RPM, and is preferably approximately 500 RPM. This will generally be referred to herein as a "low speed" state or mode. In alternate embodiments, the low speed state or mode of the condenser cooling fan 214 can be any suitable speed, other than 500 RPM. An OFF state or mode of the condenser cooling fan 214 is generally when the speed is less than the low speed state, and/or when power to the condenser cooling fan 214 is disabled or turned off.

If the speed of the condenser fan 214 is reduced or the condenser fan 214 is turned OFF while the system 200 is operating, or the compressor stage 202 is ON, the temperature of the refrigerant in the condenser stage 204 will increase. Generally, a temperature increase of approximately 20 degrees Fahrenheit can be realized when the speed of the condenser fan 214 is slowed or the condenser fan 214 is turned OFF while the cooling system 200 is operating in a cooling mode. The increase in heat of the condenser stage 204, due to slower speed or OFF state of the condenser cooling fan 214, will correspondingly cause an increase in the heat provided by the condenser loop 206, which in turn will cause the surfaces and components heated by the condenser loop 206 to also increase in temperature. The aspects of the disclosed embodiments are generally directed to cycling the condenser fan 214 to a low speed or OFF while the system 200 is operating in order to provide additional heat to the external surfaces of the refrigerator 100 that are being heated by the condenser loop 206.

In one embodiment, as shown in FIG. 2, the system 200 includes the controller 210. The controller 210 is generally configured to cycle the condenser fan 214 to a low speed or the OFF mode or state while the system 200 is operating. In one embodiment, the ON and low speed or OFF cycling of the condenser fan 214 is dependent upon a humidity level in the area of the refrigerator 100. As is shown in FIG. 2, the system 200 can include a humidity sensor(s) 212. The humidity sensor 212 is generally configured to detect and/or measure the humidity level. The humidity sensor 212 will generally be mounted to or within the refrigerator 100 in a suitable location for providing an accurate reading and/or measurement of the humidity level. Alternatively, in one embodiment, the humidity sensor 212 can be remotely located and suitably coupled to the controller 210, by for example, a wired or wireless connection.

Generally, in very dry conditions, the formation of condensation on the external surfaces of the refrigerator 100 is minimal. Thus, in areas where the relative humidity is low, and can range from approximately 9% to 17%, there will generally be minimal formation of condensation on external surfaces of the refrigerator. However, in higher humidity conditions, where the relative humidity is in the range of or above approximately 40 to 50% relative humidity, condensation formation on the external surfaces of a refrigerator 100 can be problematic. The aspects of the disclosed embodiments will cycle the condenser cooling fan 214 of the system 200 when the system 200 is in conditions that causes the formation of condensation on the external surfaces.

Figure 3:
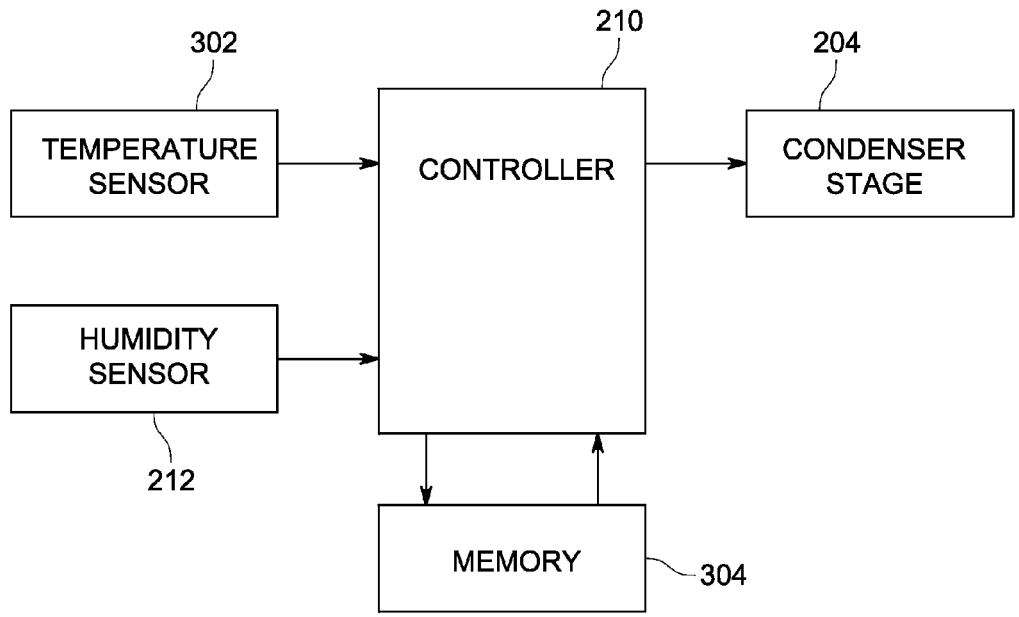
FIG. 3 is a schematic block diagram of an exemplary control system incorporating aspects of the disclosed embodiments.

In one embodiment, the referring to FIG. 3, a temperature sensor(s) 302 can also be provided. As shown in FIG. 3, the temperature sensor(s) 302 is coupled to the controller 210. The temperature sensor(s) 302 can generally be used to monitor a temperature of the condenser 216, compressor 202 and/or the ambient temperature, as well as other aspects of the cooling system 200, including for example, the evaporator temperature and compartment temperatures. In one embodiment, temperature sensor 302, or other suitable temperature controls can be used to monitor the cooling system 200 in order to ensure that the condenser 216 or other components do not get too hot or that the cooling function of the system 200 is negatively impacted when the speed of the condenser cooling fan 214 is slowed or switched OFF while the compressor stage 202 remains ON. In a situation where an over-temperature situation is detected, the condenser cooling fan 214 could be automatically cycled back to the ON state.

The aspects of the disclosed embodiments will increase the heat provided by the condenser loop 206 to the surfaces of the refrigerator 100 be warmed by the condenser loop 206 by cycling the speed of the condenser cooling fan 214 to a low speed or OFF state prior to the compressor stage cycling to the OFF state. This will increase the temperature of the refrigerant in the system 100, and in particular, the temperature of the refrigerant exiting the condenser stage 204 and entering the condenser loop 206. In one embodiment, the speed of the condenser cooling fan 214 is cycled to the low speed or OFF state a pre-determined period of time prior to the compressor stage 202 cycling to the OFF state. The pre-determined time period for cycling the condenser cooling fan 214 can be any suitable time period, such as one-minute prior to the time the compressor stage 202 goes OFF, for example. In alternate embodiments, the pre-determined time period for cycling the condenser cooling fan 214 to the low speed or OFF state can based on any one or combination of criteria, including for example, the relative humidity measured by the humidity sensor 212, the ambient temperature measure by the temperature sensor 302, a length of time the compressor stage 202 has been running, or a length of time that the condenser cooling fan 214 has been ON or at the low speed or OFF while the compressor stage 202 is running. The pre-determined time period and criteria for the various parameters can be stored in the memory 304, for example, and used by the controller 210 to cycle the condenser cooling fan 214 between the low speed or OFF state and the ON state.

Figure 4:
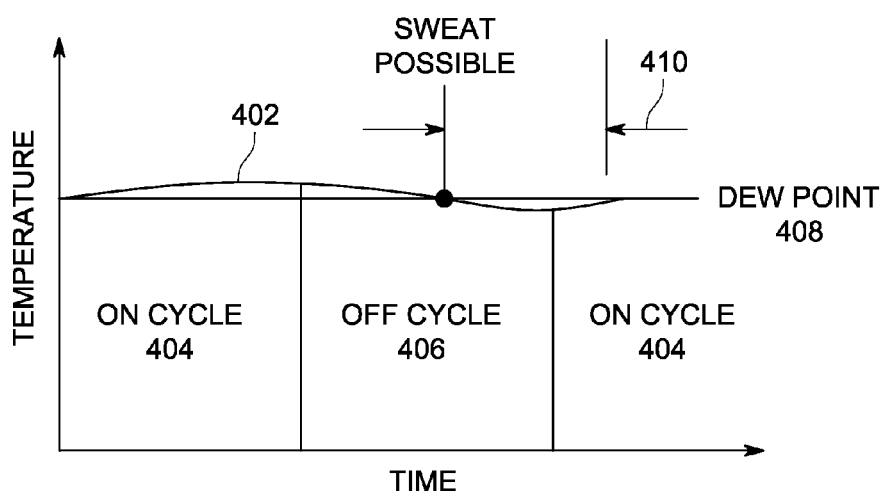
FIG. 4 is a graph illustrating a comparison of a refrigerator surface temperature to the ON and OFF cycles of a cooling system for the refrigerator.

FIG. 4 is a graph illustrating the temperature of a refrigerator surface that is being heated by a condenser loop 206. The surface temperature waveform 402 illustrates the rise and fall of the temperature of the refrigerator surface that is being heating by the condenser loop 206 during the cycling of the compressor stage 202. As shown in this example, during the ON cycle 404 of the compressor stage 202, the surface temperature 402 is generally above the dew point 408. During the low speed or OFF cycle 406, the surface temperature gradually decreases until it is at or below the dew point 408. In the next ON cycle 404 of the compressor stage 202, the surface temperature 402 of the refrigerator surface again increases above the dew point. During this time or period 410 where the surface temperature 402 is at or below the dew point 408, the formation of sweat or condensation is possible on the refrigerator surface. The aspects of the disclosed embodiments will cycle the condenser cooling fan 214 to the low speed or OFF state at a pre-determined time prior to the OFF cycle 406 of the compressor stage 202 in order to increase the surface temperature 402 of the refrigerator surface during the ON cycle 404 of the compressor stage 202. This causes the condensing temperature and the external surface temperatures to increase in temperature. Due to the increased surface temperature 402, the period 410 is minimized or eliminated during the low speed or OFF cycle 406.

Figure 5:
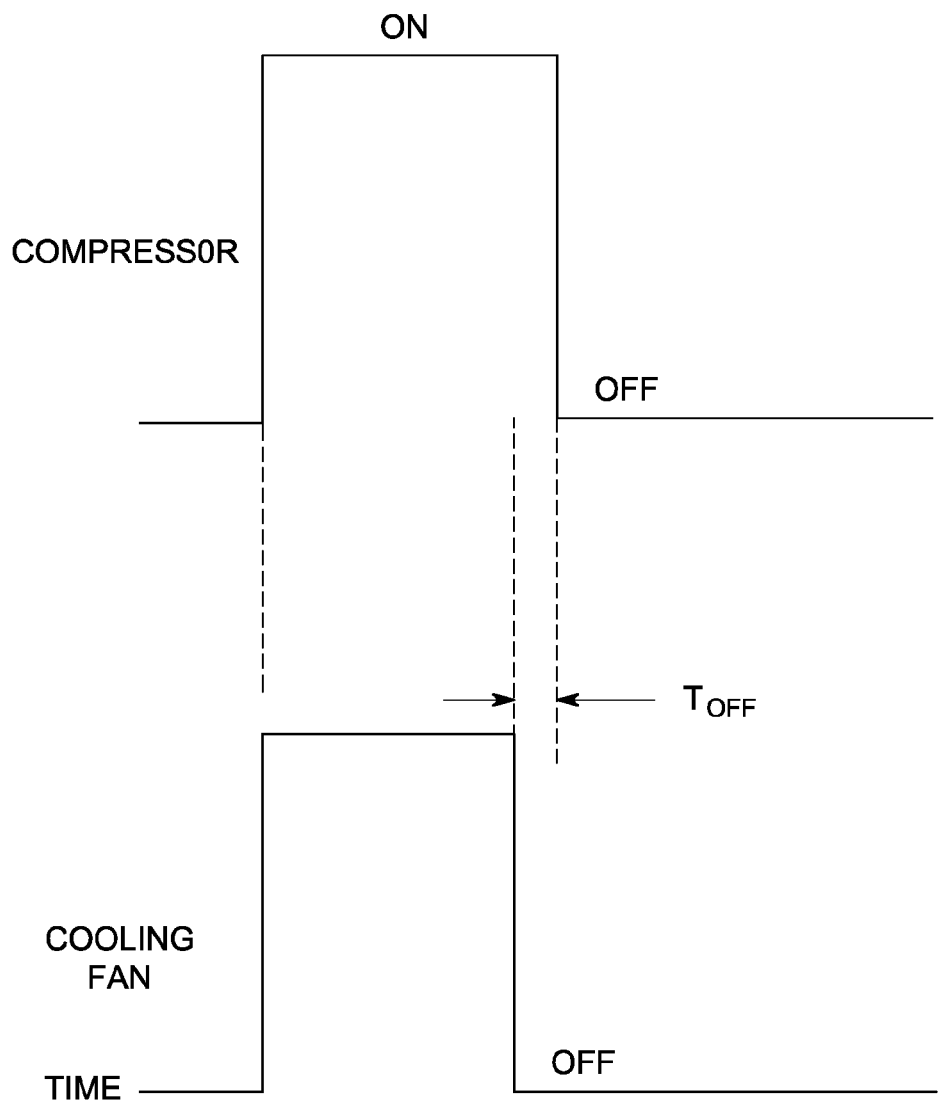
FIG. 5 is an exemplary timing diagram for operational states of a compressor and cooling fan of the cooling system of FIG. 2.

FIG. 5 is a comparison of the ON/OFF cycling of the compressor stage 202 and the changes in speed of the condenser cooling fan 214. As is shown in this example, the condenser cooling fan 214 is cycled to the low speed or OFF state a period of time $T_{OFF}$ prior to the compressor stage 202 cycling from ON to OFF. The time period $T_{OFF}$ can be pre-determined, and can be a preset time period, such as one-minute prior to the end of the ON cycle of the compressor stage 202, for example. In one embodiment, the time period $T_{OFF}$ is a function of the relative humidity as is determined by the humidity sensor 212. In alternate embodiments, any suitable parameters can be used for determining the period $T_{OFF}$, including for example, the ambient temperature or temperature of one or more components of the system 200. For example, in one embodiment, the values for the time period $T_{OFF}$ can be pre-determined for different relative humidity values and stored in the memory 304. The compressor stage 202 run times can also be pre-determined and stored. The value $T_{OFF}$ can be determined for each compressor run time at a set humidity level. When the compressor stage 202 is operating at a determined humidity level, as measured by the humidity sensor 212, the corresponding time period $T_{OFF}$ can be retrieved by the controller 210 and the controller 210 can cycle the condenser cooling fan 214 OFF at the pre-determined time $T_{OFF}$. Alternatively, a pre-determined algorithm can be applied that calculates the time period $T_{OFF}$ based on the current humidity level and the compressor run time. In one embodiment, ambient temperature as measure by the temperature sensor can also be used for the calculation of the time period $T_{OFF}$.

Figure 6:
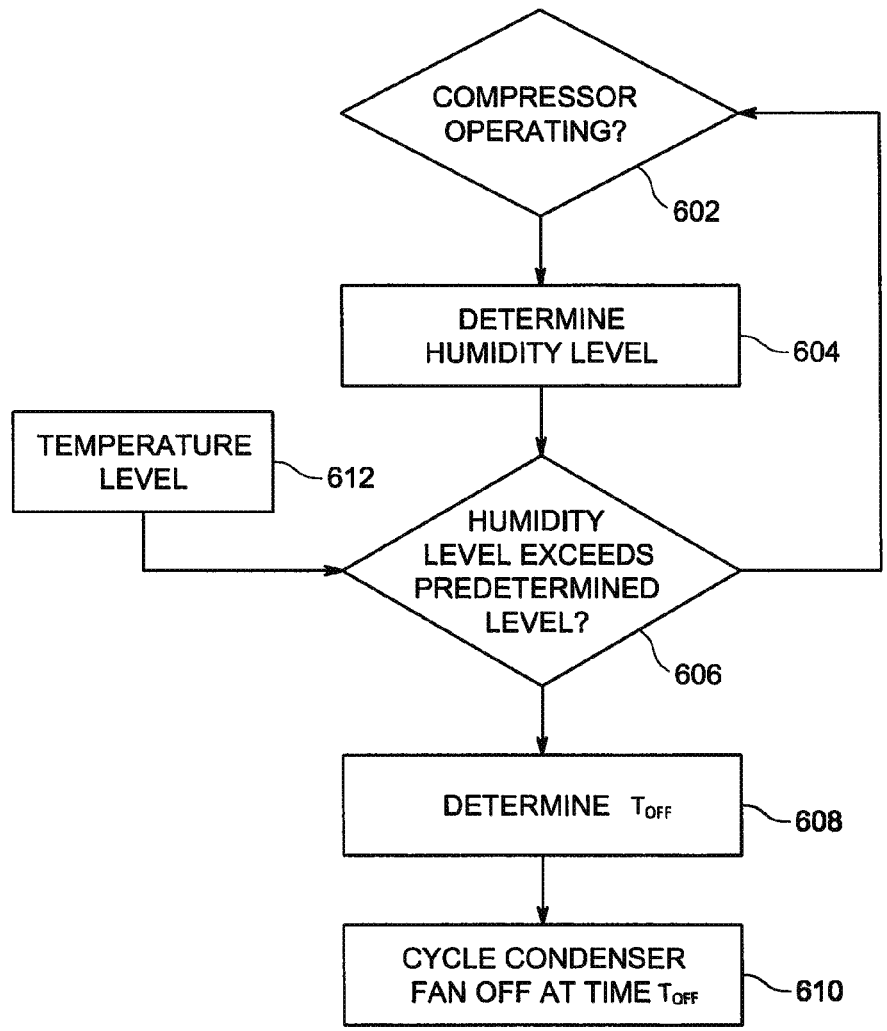
FIG. 6 is a flowchart for an exemplary process incorporating aspects of the disclosed embodiments.

FIG. 6 illustrates one example of a process incorporating aspects of the disclosed embodiments. A determination 602 is made as to whether the system 200, and in particular the compressor stage 202 is operating. If the compressor stage 202 is operating, the refrigerant is moving through the system 200. In one embodiment, the humidity level is determined 604 from the humidity sensor 212 and a determination 606 is made as to whether the humidity level is at or exceeds a pre-determined level. If the humidity level is at exceeds a pre-determined level, the time $T_{OFF}$ for the condenser-cooling fan 214 to be cycled to the low speed or OFF prior to the compressor stage 202 cycling OFF is determined 608 and the condenser cooling fan 214 is cycled 610 at the time corresponding to $T_{OFF}$. In one embodiment, the temperature level 612 can be factored in with the humidity level to determine the time $T_{OFF}$.

In one embodiment, in the event that the compressor stage 202 does not cycle OFF within a pre-determined time period after $T_{OFF}$ or the temperature of the compressor stage 202 or system 200 exceeds a pre-determined value, the condenser cooling fan 214 can be cycled back ON so as to avoid an over-temperature condition.

The aspects of the disclosed embodiments may also include software and computer programs incorporating the process steps and instructions described above that are executed in one or more computers. In one embodiment, one or more computing devices, such as a computer or the controller 210 of FIG. 2, are generally adapted to utilize program storage devices embodying machine-readable program source code, which is adapted to cause the computing devices to perform the method steps of the present disclosure. The program storage devices incorporating features of the present disclosure may be devised, made and used as a component of a machine utilizing optics, magnetic properties and/or electronics to perform the procedures and methods of the present disclosure. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

The computing devices may also include one or more processors or microprocessors for executing stored programs. The computing device may include a data storage device for the storage of information and data. The computer program or software incorporating the processes and method steps incorporating features of the present disclosure may be stored in one or more computers on an otherwise conventional program storage device.

The aspects of the disclosed embodiments are generally directed to reducing the time that a surface temperature of a refrigerator component that is warmed by a condenser loop is below the dew point. By cycling the speed of the condenser cooling fan to a low speed or OFF prior to the compressor cycling OFF, the temperature of the condenser loop increases, which increases the surface temperature of the respective refrigerator components. When the compressor cycles OFF, the surface temperature will remain above the dew point for a longer period of time during the OFF cycle. This minimizes or eliminates the formation of condensation on the respective refrigerator components without the need for additional heaters or components or the use of additional energy. The aspects of the disclosed embodiments provide a cost effective and energy efficient method of refrigerator surface heating.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A cooling system for an appliance, comprising:
    an evaporator stage;
    a compressor stage coupled to the evaporator stage;
    a condenser stage coupled to the compressor stage, the condenser stage including a condenser and a condenser cooling fan for cooling the condenser;
    a condenser loop coupled between the condenser stage and the evaporator stage;
    a humidity sensor configured to detect a humidity level in an area of the cooling system;
    a controller configured to cycle an operating state of the condenser cooling fan from ON to a low speed or OFF at a pre-determined time prior to an end of a cooling cycle and increase a temperature of a surface of the appliance thermally coupled to the condenser loop to a pre-determined level prior to the end of the cooling cycle, wherein the temperature of the surface of the appliance remains substantially at a temperature near a dew point during the end of the cooling cycle; and
    a temperature sensor coupled to the controller and for monitoring a temperature of one or more of the evaporator stage, the condenser stage, the compressor stage and the surface of the appliance, the controller being configured to detect an over temperature condition based on the monitored temperature and automatically cycle the condenser cooling fan ON,
    wherein the controller is further configured to:
        determine a compressor run time for the compressor stage during the cooling cycle;
        determine the pre-determined time prior to the end of the cooling cycle to cycle the operating state of the condenser cooling fan from ON to the low speed or OFF using the compressor run time, the detected humidity level, and an ambient temperature; and
        if the compressor stage does not cycle off within a pre-determined time period after cycling the condenser cooling fan to the low speed or OFF, cycling the condenser cooling fan ON.

2. The cooling system of claim 1, wherein the controller is further configured to cycle the operating state of the condenser cooling fan from ON to the low speed or OFF prior to the end of the cooling cycle if the detected humidity level is greater than a pre-determined humidity level.

3. The cooling system of claim 2, wherein the temperature sensor coupled to the controller is further configured to detect a temperature of the area of the cooling system, the controller being further configured to cycle the operating state of the condenser cooling fan from ON to the slow speed or OFF prior to the end of the cooling cycle when the detected temperature is less than a pre-determined value.

4. The cooling system of claim 1, wherein the pre-determined time prior to the end of the cooling cycle is approximately one-minute prior to the end of the cooling cycle.

5. The cooling system of claim 1, wherein the controller is further configured to:
    compare the detected humidity level to a set of pre-determined time values; and
    select a pre-determined time value from the set of pre-determined time values that corresponds to the detected humidity level as the pre-determined time prior to the end of the cooling cycle.

6. The cooling system of claim 1, wherein the end of the cooling cycle comprises the compressor stage cycling from ON to OFF.

7. The cooling system of claim 1, wherein the appliance is a refrigerator.

8. The cooling system of claim 7, wherein the condenser loop is configured to heat an external surface of the refrigerator.

9. The cooling system of claim 1 wherein the low speed of the condenser cooling fan is approximately 500 RPM.

10. A refrigerator comprising:
    a cabinet defining a plurality of storage compartments;
    a cooling system configured to cool the storage compartments during a cooling cycle, the cooling system comprising a condenser and a condenser cooling fan;
    a controller, the controller being configured to control the condenser cooling fan by cycling the condenser cooling fan to a low speed or an OFF state at a pre-determined time prior to an end of the cooling cycle and increase a temperature of a surface of the refrigerator thermally coupled to a condenser loop of the cooling system to a pre-determined level prior to the end of the cooling cycle, wherein the temperature of the surface of the refrigerator remains substantially at a temperature near a dew point during the end of the cooling cycle;
    a temperature sensor coupled to the controller and for monitoring a temperature of one or more of the condenser and the surface of the refrigerator, the controller being configured to detect an over temperature condition based on the monitored temperature and automatically cycle the condenser cooling fan to an ON state; and
    a humidity sensor configured to detect a humidity level in an area of the cooling system,
    wherein the controller is further configured to:
        determine the pre-determined time prior to the end of the cooling cycle to cycle an operating state of the condenser cooling fan from the ON state to the low speed or the OFF state using the compressor run time, the detected humidity level, and an ambient temperature; and
        if the compressor stage does not cycle off within a pre-determined time period after cycling the condenser cooling fan to the low speed or the OFF state, cycling the condenser cooling to the ON state.

11. The refrigerator of claim 10, wherein the humidity sensor is coupled to the controller, and the humidity sensor is further configured to detect an ambient humidity level in an area of the refrigerator, the controller being enabled to cycle the condenser cooling fan to the low speed or the OFF state only if the detected ambient humidity level is greater than a pre-determined humidity level.

12. The refrigerator of claim 11, wherein the temperature sensor is further configured to detect an ambient temperature of the area of the refrigerator, the controller being enabled to cycle the condenser cooling fan to the low speed or the OFF state only if the detected ambient temperature is less than a pre-determined temperature level.

13. The refrigerator of claim 10, wherein the pre-determined time prior to the end of the cooling cycle is approximately one-minute prior to the end of the cooling cycle.

14. The refrigerator of claim 10, wherein the pre-determined time prior to the end of the cooling cycle is a function of an ambient humidity level in an area of the refrigerator.

15. The refrigerator of claim 10, wherein the cooling system further comprises a compressor, the controller being configured to cycle the condenser cooling fan to the low speed or the OFF state while the compressor is running.

16. A method comprising:
    determining an ambient humidity level in an area of an appliance;
    controlling an operating cycle of a condenser cooling fan in a cooling system for the appliance during a cooling cycle by causing the condenser cooling fan to cycle to a low speed or OFF at a pre-determined time prior to an end of the cooling cycle when the ambient humidity level exceeds a pre-determined value;
    increasing a temperature of a surface of the appliance thermally coupled to a condenser loop of the cooling system to a pre-determined level prior to the end of the cooling cycle, wherein the temperature of the surface of the appliance remains substantially above or at a temperature near a dew point during the end of the cooling cycle;
    monitoring a temperature of the cooling system and the surface of the appliance, a controller being configured to detect an over temperature condition based on the monitored temperature;
    automatically cycling the condenser cooling fan ON when the over temperature condition is detected;
    determining a compressor run time for a compressor stage during the cooling cycle;
    determining the pre-determined time prior to the end of the cooling cycle to cycle the condenser cooling fan from ON to the low speed or OFF using the compressor run time, the ambient humidity level, and an ambient temperature; and
    if the compressor stage does not cycle off within a pre-determined time period after cycling the condenser cooling fan to the low speed or OFF, cycling the condenser cooling fan ON.

17. The method of claim 16, wherein the pre-determined time prior to the end of the cooling cycle is approximately one minute prior to the end of the cooling cycle.

18. The method of claim 16, wherein the pre-determined time prior to the end of the cooling cycle is determined by:
    comparing the determined ambient humidity level to a set of pre-determined time values; and
    selecting a pre-determined time value from the set of pre-determined time values that corresponds to the determined ambient humidity level as the pre-determined time prior to the end of the cooling cycle.

19. The method of claim 18, further comprising determining an ambient temperature level in the area of the appliance and enabling the condenser cooling fan to cycle to the low speed or OFF at the pre-determined time prior to the end of the cooling cycle when the ambient temperature level exceeds a pre-determined value.

20. The method of claim 16 wherein the low speed of the condenser cooling fan is approximately 500 RPM.

* * * * *